Nov. 27, 1928.  G. J. HENRY  1,693,032
FLOATING VALVE SEAT
Filed Oct. 29, 1926
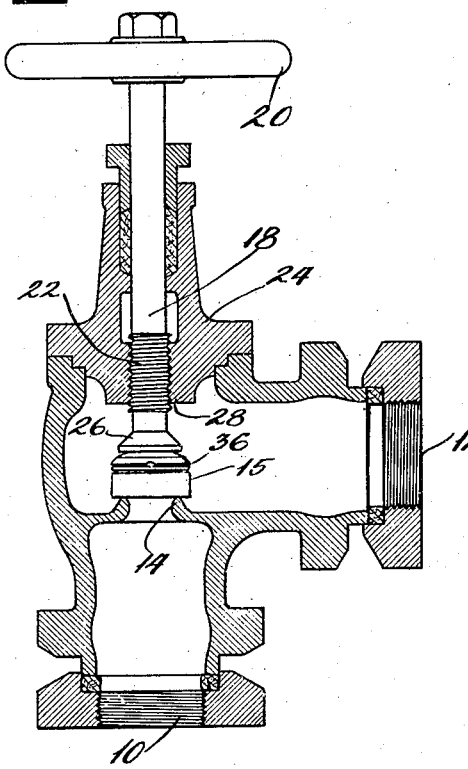
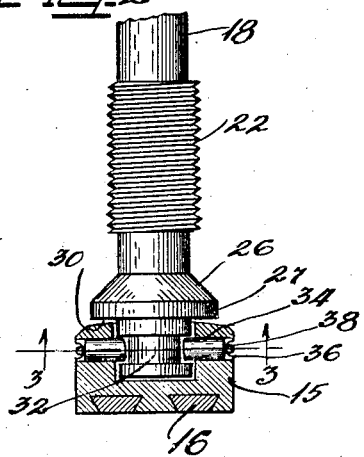
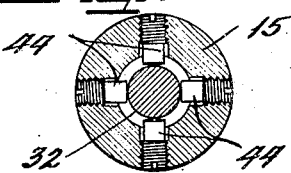
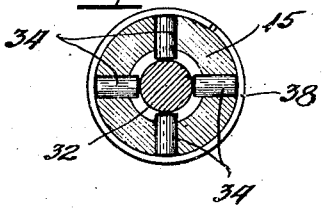
Witnesses
Inventor
Guy J. Henry.
by Charles H. Hills
Atty.

Patented Nov. 27, 1928.

1,693,032

UNITED STATES PATENT OFFICE.

GUY J. HENRY, OF CHICAGO, ILLINOIS.

FLOATING-VALVE SEAT.

Application filed October 29, 1926. Serial No. 144,945.

This invention relates to valves of the type which are seated by a positive thrust and opened by a positive pull. When such valves are used to control fluid acting under heavy pressure, it is necessary that the valve be pressed strongly against its valve seat. In most valves of this type such pressure is exerted by means of a screw. This means that to increase the pressure of the valve against the seat, the valve must be rotated a turn or a fraction of a turn while in contact with the seat. The friction between a valve and its seat under such circumstances is very great, so that the force required to cause the valve to press against the seat with the desired tightness is great. Also, after a valve has been seated by the exercise of such great force, it requires a force of nearly the same degree to start the valve when opening it again.

It is an object of the present invention to devise a valve which may be brought into contact with its seat with a high degree of tightness without the exercise of a very great force, and which can be opened after it has been tightly closed without requiring any great effort.

It is a further object of this invention to provide a valve with a seating face which shall be free to tilt through a small angle relative to the valve stem in any direction, so that the valve face may accurately seat itself upon the valve seat.

It is a further object of this invention to greatly reduce the area of the surfaces exerting friction when a valve of the type actuated by a screw is being seated.

Other and further important objects of this invention will be apparent from the disclosures in the specification and the accompanying drawings.

The invention (in a preferred form) is illustrated in the drawings and hereinafter more fully described.

On the drawings:

Figure 1 is a section through the valve casing illustrating the valve which is the subject of my invention.

Figure 2 is a section upon an enlarged scale through the valve and valve seat member.

Figure 3 is a section upon the line 3—3 of Figure 2.

Figure 4 is a section similar to Figure 3, showing a modification.

As shown on the drawings:

The valve has an inlet 10 and an outlet 12 both provided with threaded collars and packing for securing the valve to the pipe which it is to control. A valve seat 14 in the partition separating the inlet 10 from the outlet 12 is intended to contact with the lower surface of a valve face member 15. Preferably the surface is provided with an inlay 16 of soft metal to insure an accurate fit between the valve face and the valve seat. The valve stem 18 is operated by any desired means. The means illustrated is a hand wheel 20. This stem has a screw-threaded portion 22 which cooperates with threads cut in the valve cap 24 in the usual way. The lower end of the valve stem 18 has a beveled shoulder 26 leading to an enlargement 27 and at the lower end of the top 24 is a seat 28 to cooperate with the beveled shoulder 26 to form a tight joint when the valve is wide open. The lower face of the enlargement 27 affords a square shoulder 30. The stem 18 continues beyond the shoulder 30. And the valve face member 15 is provided with a hole to receive the end of the stem. The part of the stem 18 below the shoulder 30 is provided with a groove 32 which affords a seat for the inner end of a number of pins 34. These pins extend through radial holes in the valve face member 15. The outer ends of these holes enter a groove 36 in the circumferential face of the valve face member 15. The split ring 38, which snaps into the groove 36, serves to retain the pins 34 in place. The distance between the radial holes in the valve face member 15 and the top of said member is slightly smaller than the distance between the groove 32 and the shoulder 30. Also, the distance from the groove 32 to the lower end of the stem 18 is slightly smaller than the distance from the pins 34 to the bottom of the hole in the valve face member 15.

A very small longitudinal play is possible between the face member 15 and the stem 18. Also it is possible for the face member to very slightly tilt in any direction relative to the stem 18.

In the form illustrated in Figure 4, the pins 34 are replaced by screws 44 which are threaded into the radial holes in the valve face member 15. Since the threads hold the screws in place, a ring similar to the ring 38 is not needed and the groove 36 is therefore omitted.

In the operation of the device, the valve stem 18 is rotated by the hand wheel 20 which causes the screw 22 to travel through the top 24 of the valve case. As the valve stem travels downward, the lower face of the valve face member 15 comes into contact with the valve seat 14. As soon as this contact is established, the friction between the valve seat 14 and the soft metal 16 prevents or retards the rotation of the valve face member 15. Rotation of the valve stem 18 is, however, still possible. The upper wall of the groove 32 presses against but slides over the top surface of the pins 34. How far this motion can go depends on the pitch of the screw 22. Rotation of the stem 18 can be continued until the soft metal 16 has been forced against the valve seat 14 with sufficient tightness. During this forcing action the valve face member 15 may tilt about the stem 18 to accommodate itself to the inaccuracy, if any, of the valve seat 14, so that the valve seat does not need to be as accurately positioned as with the valve seats of prior use. When it is desired to open the valve, the wheel 20 is rotated in the opposite direction so that the screw 22 travels upward through the top 24 of the valve casing. A short motion of this screw relieves the pressure upon the upper surface of the pins 34. As the surface where these pins contact the wall of the groove 32 is very small, there will be very little friction to oppose the beginning of the movement of the screw 22. As soon as the movement has begun, the wall of the groove is lifted away from the pins 34 so that no further friction is exerted. A very small upward movement of the valve stem 18 is sufficient to bring the lower wall of the groove 32 into contact with the pins 34. The sliding movement between this lower wall of the groove 32 and the pins 34 will occur only to the very small extent needed to sustain the pins and the valve face member 15, so that even if the valve seat 14 and the soft metal 16 adhere strongly, no great friction is introduced and the small force exerted upon the hand wheel 20 as applied by the mechanical advantage of the screw 22 is available for pulling the valve case away from the valve seat. Consequently the valve is easily and positively opened.

I am aware that numerous details of construction may be varied through a wide range without departing from the principles of this invention, and I therefore do not purpose limiting the patent granted otherwise than necessitated by the prior art.

I claim as my invention:

In a valve, a valve seat, a valve face member adapted to contact therewith, a valve stem having a groove adajcent its lower end, bearing members seated in said valve face member and projecting into said groove, said bearing members permanently withholding said valve stem from direct contact with said valve face member.

In testimony whereof I have hereunto subscribed my name.

GUY J. HENRY.